Patented Nov. 6, 1934

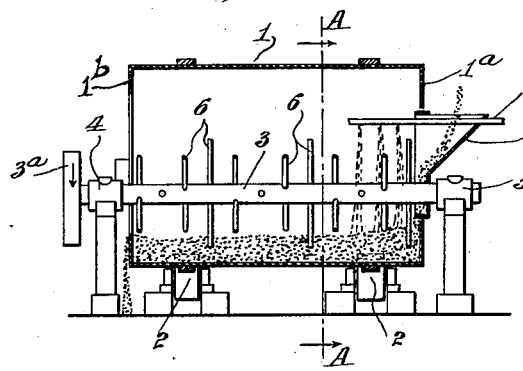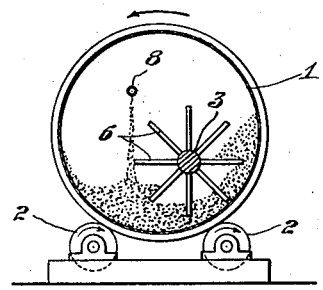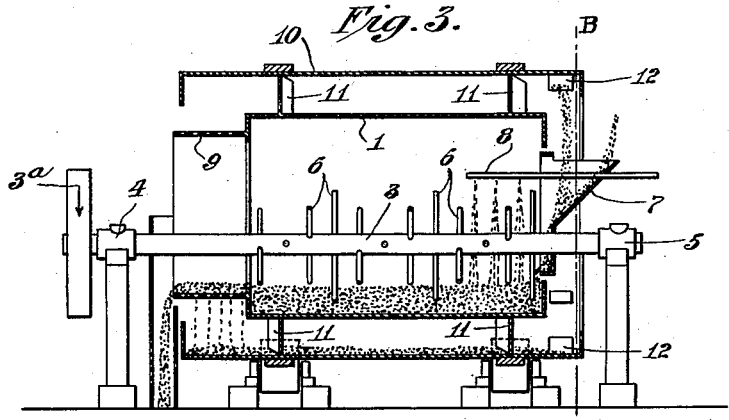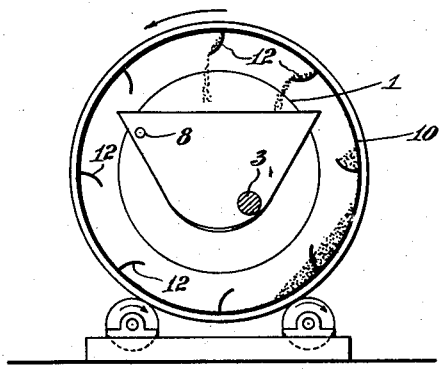

1,980,130

UNITED STATES PATENT OFFICE 1,980,130

NODULIZING CEMENT MATERIALS, ETC.

Johan S. Fasting, Valby, near Copenhagen, Denmark, assignor to F. L. Smidth & Co., New York, N. Y., a corporation of New Jersey Application November 22, 1933, Serial No. 699,193
In Great Britain December 5, 1932

9 Claims. (Cl. 222—5)

In the preparation of cement raw materials for burning it is desirable that such materials, after they have been ground either by the dry process or by the wet process, shall be agglomerated or nodulized to form small bodies or nodules for introduction into the kiln. If the materials have been prepared by the dry process they must be moistened to permit the formation of nodules, while if they have been prepared by the wet process they must be de-watered to some extent. Heretofore it has been usual to subject dry materials to the action of a mixing worm or a rotary drum or to the action of a mixing worm in a rotary drum in which water is added as the mixing proceeds. It has been found, however, that the use of a mixing worm yields soft lumps which are more or less heterogeneous and that while treatment in a rotary drum gives nodules that are rounder and more uniform, the nodules so formed are not very compact and do not offer sufficient resistance to the abrasive and disintegrating actions and the heat to which they are subjected in the kiln. The apparatus hitherto employed in the nodulizing of de-watered slurry has not been found to be very practical and satisfactory in use.

The purpose in view in the development of the present invention has been to enable the formation of homogeneous nodules, sufficiently dense and compact to resist the abrasive and disintegrating actions to which they are subjected in the kiln, to be accomplished more readily than has heretofore been possible and it has been found that the desired result can be attained by subjecting the properly moistened materials to simultaneous tumbling and beating operations. It has been found that in this manner relative motion of the materials, that is, of the constituents and of different portions of the mass, is increased and that a distinctly stronger bonding together of the constituents of the nodules is effected. In the treatment of dry cement material or raw meal the necessary amount of water may be added as the meal is introduced into the apparatus, while the de-watering of slurry, by any suitable means, obviously must be accomplished before it reaches the apparatus. The addition of dry material, such as calcined or partially calcined material, may be effected either before the de-watered slurry reaches the apparatus or in the apparatus itself.

The subjection of the materials simultaneously to the tumbling operation and the beating operation is accomplished in a rotary drum in which is placed a beater which is preferably rotated in a direction opposite to that of the rotation of the drum itself, the action of the beater being thereby in opposition to the movement of the mass of materials introduced by the rotation of the drum. Not only is the material thus subjected to something of a compressive action but the larger lumps which may have been formed by agglomeration of the materials are broken up, a more uniform size of the nodules ultimately produced being thereby promoted.

The invention will be more fully explained hereinafter with reference to the accompanying drawing in which are shown somewhat conventionally and in outline different forms of apparatus in which the invention may be practiced, and in which:

Figure 1 is a view in longitudinal, sectional elevation of one form of apparatus.

Figure 2 is a view of the same in transverse, sectional elevation, the plane of section being indicated by the broken line A—A of Figure 1.

Figure 3 is a view generally similar to Figure 1, but showing a somewhat different form of the apparatus.

Figure 4 is a view of the same in sectional elevation, the plane of section being indicated by the broken line B—B of Figure 3.

In the apparatus shown in Figures 1 and 2 the drum 1 is supported upon and rotated by rolls 2 which may be actuated in any convenient manner. The end wall 1ª of the drum at the feeding end is formed with a large central opening to receive a stationary feeding chute 7 and, it may be, a stationary water supply pipe 8. At the discharge end of the drum the end wall 1ᵇ is shown as an annular flange, leaving a large central opening. The shaft 3 of the beater, introduced through the central openings in the end walls of the drum and eccentrically disposed within the drum, may be supported upon suitable bearing blocks 4, 5 and have applied at one end a wheel 3ª by which it may be rotated preferably in a direction opposite to the direction of rotation of the drum 1. The shaft 3 is shown as provided with beater arms 6 which move through the moistened materials within the drum, preferably in opposition to the movement of the materials with the drum, and serve to stir thoroughly and beat the materials, effecting a homogeneous mixture of the constituents of the entire mass and at the same time effecting the agglomeration of the materials into nodules which are generally spherical in shape and are in themselves homogeneous and sufficiently compact to withstand the disintegrating action to which they may be subjected as in a rotary kiln before they reach the sintering zone of the kiln. The nodules so formed pass from the drum over the lip of the annular wall at the discharge end and may then be transported by any convenient means directly to the kiln. The beater arms 6 are preferably arranged helically so that the longitudinal movement of the materials through the drum may be promoted thereby.

In the apparatus shown in Figures 3 and 4 the rotary drum 1 and the beater 3, 6 may be formed and arranged as previously described with respect to the form of apparatus shown in Figures 1 and 2; but in this form of apparatus the drum 1 is provided at its discharge end with a perforated or reticular screen 9 from which the nodules are discharged while such material as may not have been sufficiently agglomerated or formed into nodules is delivered into a surrounding drum 10 which supports the drum 1 through members 11 which may be formed as conveyor flights for the purpose of returning the non-agglomerated materials to the feeding end of the drum where they may be taken up by lifters 12 and discharged into the feeding chute 7.

It will be understood that the invention, either as a method practiced in suitable apparatus or as exemplified in apparatus, is not restricted to the arrangements shown and described herein, except as may be pointed out in the accompanying claims.

I claim as my invention:

1. The method of nodulizing cement materials and the like, which consists in subjecting the materials in a moist condition simultaneously to a tumbling operation and a beating operation.

2. The method of nodulizing cement materials and the like, which consists in subjecting the materials in a moist condition simultaneously to a tumbling operation and a beating operation, the direction of the beating being in opposition to the direction of movement of the materials in tumbling.

3. The method of nodulizing cement materials and the like, which consists in subjecting the materials in a moist condition simultaneously to a tumbling operation and a beating operation and adding dry calcined material during the simultaneous tumbling and beating operations.

4. An apparatus for the nodulizing of cement materials and the like, comprising a rotary drum to which the materials may be fed, and a rotary beater eccentrically disposed within the drum.

5. An apparatus for the nodulizing of cement materials and the like, comprising a rotary drum to which the materials may be fed, a rotary beater eccentrically disposed within the drum, and means to rotate the beater in a direction opposite to that of rotation of the drum.

6. An apparatus for the nodulizing of cement materials and the like, comprising a rotary drum to which the materials may be fed, and a rotary beater eccentrically disposed within the drum, the beater comprising a shaft and projecting arms.

7. An apparatus for the nodulizing of cement materials and the like, comprising a rotary drum to which the materials may be fed, and a rotary beater eccentrically disposed within the drum, the beater comprising a shaft and projecting arms helically arranged.

8. An apparatus for the nodulizing of cement materials and the like, comprising a rotary drum to which the materials may be fed, a cylindrical screen extended from the discharge end of the drum, a second drum surrounding the first named drum and spaced therefrom and adapted to receive the material passed by the screen, and means to return such material from the second named drum to the feeding end of the first named drum.

9. An apparatus for the nodulizing of cement materials and the like, comprising a rotary drum to which the materials may be fed, a cylindrical screen extended from the discharge end of the drum, a second drum surrounding the first named drum and spaced therefrom and adapted to receive the material passed by the screen, means to return such material from the second named drum to the feeding end of the first named drum, and conveyor flights between the drums to move the material passed by the screen toward the other end of the second named drum.

JOHAN S. FASTING.